(12) United States Patent
Trench

(10) Patent No.: US 10,252,194 B2
(45) Date of Patent: Apr. 9, 2019

(54) CENTRIFUGAL SCREEN ASSEMBLY

(71) Applicant: Weir Minerals Australia Ltd, Artarmon, New South Wales (AU)

(72) Inventor: Michael Trench, Redcliffe (AU)

(73) Assignee: WEIR MINERALS AUSTRALIA LTD (AU)

( * ) Notice: Subject to any disclaimer, the term of this patent is extended or adjusted under 35 U.S.C. 154(b) by 281 days.

(21) Appl. No.: 15/108,386

(22) PCT Filed: Feb. 24, 2015

(86) PCT No.: PCT/AU2015/050070
§ 371 (c)(1),
(2) Date: Jun. 27, 2016

(87) PCT Pub. No.: WO2015/123735
PCT Pub. Date: Aug. 27, 2015

(65) Prior Publication Data
US 2016/0325207 A1    Nov. 10, 2016

(30) Foreign Application Priority Data

Feb. 24, 2014 (AU) .................... 2014900595

(51) Int. Cl.
*B01D 33/067* (2006.01)
*B04B 3/04* (2006.01)
(Continued)

(52) U.S. Cl.
CPC ......... *B01D 33/067* (2013.01); *B01D 33/466* (2013.01); *B01D 33/72* (2013.01);
(Continued)

(58) Field of Classification Search
None
See application file for complete search history.

(56) References Cited

U.S. PATENT DOCUMENTS

| 4,922,625 A | 5/1990 | Farmer |
| 4,961,722 A | 10/1990 | Taylor et al. |

(Continued)

FOREIGN PATENT DOCUMENTS

| AU | 508085 B2 | 3/1980 |
| WO | 2005089963 A1 | 9/2006 |

(Continued)

OTHER PUBLICATIONS

Communication and Supplementary European Search Report of EP Application No. EP15752427.3, dated Apr. 19, 2018.

(Continued)

*Primary Examiner* — Chester T Barry
(74) *Attorney, Agent, or Firm* — Foley & Lardner LLP

(57) ABSTRACT

A screen assembly (10) for a horizontal screen machine has a screen body (12) diverging axially from an inlet end (13). A base wall portion (15) mounts the screen body (12) for rotation and includes eight substantially radial webs (16). An annular wall portion (21) is located adjacent the inner end (13) and includes drain passages (24) adapted to drain discontinuities in a bonding layer comprising a moisture cure polyurethane sealant/adhesive overlying the annular wall portion (21). Wear resistant tungsten carbide elements (26) include a plurality of apertures (27) extending through a wear face to a bonding face. Voids (32) in the discontinuous bonding layer (31) provide fluid interconnection between the apertures (27) and the drain passages (24). A replaceable screen member (33) is releasably secured at an inner ring frame (22) and an outer ring frame (36) of the screen body (12).

49 Claims, 6 Drawing Sheets

(51) Int. Cl.
  *B04B 7/18* (2006.01)
  *B01D 33/46* (2006.01)
  *B01D 33/72* (2006.01)
  *B01D 33/80* (2006.01)

(52) U.S. Cl.
  CPC .............. *B01D 33/801* (2013.01); *B04B 3/04* (2013.01); *B04B 7/18* (2013.01)

(56) References Cited

U.S. PATENT DOCUMENTS

| | | | |
|---|---|---|---|
| 5,125,166 A | | 6/1992 | Farmer |
| 5,368,943 A | * | 11/1994 | Baghdachi ............. C03C 17/30 428/423.1 |
| 5,378,364 A | * | 1/1995 | Welling ................ B01D 33/11 210/512.1 |
| 5,380,434 A | * | 1/1995 | Paschedag ............ B01D 33/11 210/360.2 |
| 6,109,452 A | * | 8/2000 | Leung ................ B01D 33/067 210/369 |
| 2002/0137369 A1 | * | 9/2002 | Edwards .............. H05K 7/1061 439/77 |
| 2003/0234214 A1 | * | 12/2003 | Mullins .................... B04B 3/04 210/360.1 |
| 2011/0006016 A1 | | 1/2011 | Gilles |
| 2016/0310970 A1 | * | 10/2016 | Gardiner ................ B04B 11/06 |

FOREIGN PATENT DOCUMENTS

| | | |
|---|---|---|
| WO | 2008116245 A1 | 10/2008 |
| WO | WO-2008/116245 A1 | 10/2008 |

OTHER PUBLICATIONS

International Search Report and Written Opinion issued by the Australian Patent Office regarding International Patent Application No. PCT/AU2015/050070, dated Jul. 2, 2015, 12 pages.

International Preliminary Report on Patentability issued by the Australian Patent Office regarding International Patent Application No. PCT/AU2015/050070, dated May 18, 2016, 4 pages.

\* cited by examiner

CENTRIFUGAL SCREEN ASSEMBLY

CROSS REFERENCE

This application is a U. S. national phase application of co-pending international patent application number PCT/AU2015/050070,filed Feb. 24, 2015, which claims priority to Australian patent application number 2014900595, filed Feb. 24, 2014, the entire disclosures of which are hereby incorporated herein by reference.

TECHNICAL FIELD

This disclosure relates in general to centrifugal screen assemblies and, in particular, to an improved centrifugal screen assembly for use in scroll screen machines.

BACKGROUND OF THE DISCLOSURE

A scroll centrifugal screening machine may be of the type including a housing divided vertically by a dividing wall into an underflow chamber passing to a drain and an overflow chamber passing to an outlet for product. A circular opening through the dividing wall is coaxial with a concentric drive output assembly.

A horizontal centrifugal machine may include a rotating screen assembly having a base portion mounted to an outer output flange of the concentric drive output assembly and closing a narrow end of a conical-section screen formed of a plurality of axially spaced frames interconnected by a plurality of circumferentially spaced stringers and supporting therein a screening surface layer, the outermost one of the frames being located substantially in the plane of and rotating in close proximity to the periphery of the circular opening and defining an open outer end of the screen assembly.

A scroll is mounted to an inner drive shaft of the concentric drive output assembly to be driven differentially (i.e. either a percentage faster or slower) relative to the rotating screen assembly. The scroll includes scraper portions that clear product from the screening surface and impels it toward the open outer end, to fall into the overflow chamber and thence to the gravity outlet.

A source of liquid-entrained material to be screened is delivered through a conduit passing through the open outer end and extending to adjacent the base portion. The conduit may be associated with and supported by a closure member selectively closing a maintenance opening into the housing.

A vertical centrifugal machine may also include a rotating screen assembly having a base of spoke piece portion mounted to an outer output flange of the concentric drive output assembly and secured to the wide end of a conical-section screen formed of a plurality of axially spaced frames interconnected by a plurality of circumferentially spaced stringers and supporting therein a screening surface layer, the outermost one of the frames mounted to the base of spoke piece being located substantially in the plane of and rotating in close proximity to the periphery of the circular opening and defining an open outer end of the screen assembly.

A scroll is again mounted to an inner drive shaft of the concentric drive output assembly to be driven differentially (i.e. either a percentage faster or slower) relative to the rotating screen assembly. The scroll includes scraper portions that clear product from the screening surface and impels it toward the base of spoke piece, to pass therethrough and fall into the overflow chamber and thence to the outlet.

A source of liquid-entrained material to be screened is delivered through a coaxial conduit closely conforming to the narrow inner end of the screen assembly.

In the art of centrifugal screens, there has been an economic tension between long-life components mounting wear components versus more integral assemblies which are changed out as a unit.

Screen assemblies comprised of long-life components mounting wear components represents to a more traditional technology where a heavy, balanced, cast end wall forms the driven, inner end of a horizontal screen assembly, or a "base-of-spoke" piece forms the driven, outer end of a vertical screen assembly. A basket-supporting cage is bolted or set screwed to the end wall or base-of-spoke piece respectively, and the assembly rebalanced. A screening surface assembly is bolted or machine screwed to the cage to forming the rotating part of the centrifugal screen, and the assembly balanced again. The screening surface assembly or the basket supporting cage adjacent the end wall or base of spoke piece, and an outer peripheral portion of the end wall in a horizontal machine, provide a wear resistant zone.

The servicing regime requires setting up craning means to support the assembly, unbolting the end wall or base-of-spoke from the drive flange, extracting the assembly from the screen assembly housing, replacing one or both of the screening surface assembly and cage, rebalancing as assembly progresses and reinstalling the assembly in the housing. The regime assumes that several screening surface assemblies will be replaced before the cage is replaced and that several cages will be replaced before the end wall or base-of-spoke piece is replaced.

SUMMARY OF THE DISCLOSURE

In a first aspect, there is provided a centrifugal screen assembly including:
  a substantially frustoconical-shaped screen body mounted for in-use driven rotation about a central axis and diverging axially from an inner, inlet end to an outer, discharge end;
  a substantially frustoconical screen member supported in said screen body and defining a screening surface extending from said discharge end toward said inner end;
  an annular wall portion located on said screen body adjacent the inner end and extending axially substantially to said screen member, and
  a plurality of wear resistant elements secured by a discontinuous bonding layer to and substantially covering the annular wall portion.

Embodiments in accordance with this aspect may be advantageous over both of the competing known methods by wearing out slower than the integral screen assemblies and having lower maintenance overhead than the long-life component screen assemblies.

In certain embodiments, the annular wall portion may include drain passages adapted to drain discontinuities in said bonding layer. The drain passages may be selected from one or more a plurality of drainage grooves opening through an edge of the annular wall portion adjacent the screen member, and a plurality of apertures passing radially through the annular wall portion. The apertures passing radially through the annular wall portion may be a plurality of spaced, substantially axial slots. The gauge of the slots may be any gauge to enable the drainage of the discontinuities intersecting them.

In other certain embodiments, the wear resistant elements may include a bonding face adhered to the discontinuous bonding layer and an opposite wear face. The plurality of wear resistant elements may comprise ceramic elements. The ceramic elements may be formed form a material selected from the group comprising carbides, nitrides and refractory oxides of metals. For example, the material may be selected from the group comprising tungsten carbide, aluminium oxide and partially stabilized zirconia.

In yet another embodiment, the wear resistant elements may include a plurality of apertures extending through wear face to the bonding face to intersect a discontinuity in the bonding layer. Alternatively the wear resistant elements may abut in a manner to permit some drainage from the wear face to a discontinuity in the bonding layer. The apertures may have a cross section of less than the screen gauge of said screen surface. For example, it has been found that ceramic wear elements may be provided with slots of about 1 mm gauge. The apertures may comprise one or more rows of substantially axial slots.

In still another embodiment the discontinuous bonding layer may comprise an elastomeric adhesive layer. The elastomeric adhesive layer may be selected from one or more moisture cure polyurethane adhesive materials. Examples may include sealant/adhesive systems of the type marketed under the SIKAFLEX® brands.

In still another embodiment, the frustoconical-shaped screen body may include a supporting structure comprising axially spaced ring frames interconnected by a plurality of stringers, the annular wall portion being a continuous annulus formed of a material selected from ferrous alloys and welded to one or more of the ring frames and stringers.

In still another embodiment, the frustoconical-shaped screen member may have its screening surface defined by a plurality of wedge wires. The screen member may be a frustoconical shape fabricated from segments cut from flat wedge wire panels, the segments being pressed to a selected curvature and welded together. The screen surface member may be integral with the frustoconical-shaped screen body.

However, as the screen surface is a high wear component, in still another embodiment, the frustoconical-shaped screen member may be replaceable in the screen body. The supporting structure may include axially spaced ring frames interconnected by a plurality of stringers, the annular wall portion being supported between the inner end and a selected inner ring frame, the discharge end being defined by an outer ring frame, the replaceable screen member being releasably secured to the inner and outer ring frames.

The replaceable screen member may be a frustoconical shape fabricated from segments cut from flat wedge wire panels, the segments being pressed to a selected curvature and welded together, the axial ends of the screen member each having a radially directed mounting elements releasably secured to the inner and outer ring frames. The mounting elements may be selected from radially directed lugs and a radially directed flange.

In still another embodiment, the centrifugal screen assembly may be selected from horizontal scroll centrifugal screen assemblies having a base wall portion closing the inner end and mounting the screen body for said rotation. The base wall portion may include a plurality of substantially radial webs located on the exposed working face of the base portion and extending substantially to the wear resistant elements. This serves the purpose of creating a dead space adjacent the base wall, reducing its wear rate. The plurality of substantially radial webs may include at least four substantially radial vanes of at least 40 mm height above the exposed working face of the base wall portion.

In a second aspect, there is provided a centrifugal screening machine comprising:
a horizontal centrifugal screen assembly as defined in the first aspect, mounted for said rotation in a housing; and
a delivery assembly entering the housing and passing into the screen body through the delivery end and having an outlet for material to be screened located adjacent the inner end.

Alternatively, the centrifugal screen assembly may be selected from vertical centrifugal screen assemblies having a base of spoke piece mounting said screen body at the discharge end for the rotation.

Accordingly, in a third aspect, there is provided a centrifugal screening machine including:
a vertical centrifugal screen assembly as defined in the first aspect, mounted for said rotation in a housing; and
a delivery assembly entering the housing adjacent the inner end and having an annular outlet for material to be screened substantially occluding said inner end.

In a fourth aspect, there is provided a centrifugal screen assembly including:
a frustoconical-shaped screen body having a central axis, the screen body including a frame portion and a replaceable screen member, the screen body being mounted for driven rotation about its central axis in a housing, the screen diverging axially from an inner end to an outer, discharge end located in an aperture in a wall portion of the housing; and
an annulus defining a screen wall portion adjacent the inner end and extending axially to the replaceable screen member.

In certain embodiments, the frame portion may include a supporting structure comprising axially spaced ring frames interconnected by a plurality of stringers. The annulus may be located between the inner end and a selected inner ring frame, the discharge end being defined by an outer ring frame, the replaceable screen member being releasably secured to the inner and outer ring frames.

In certain embodiments, the replaceable screen member is of a frustoconical shape fabricated from segments cut from flat wedge wire panels, the segments being pressed to a selected curvature and welded together, the axial ends of the screen member each having a radially directed mounting elements releasably secured to the inner and outer ring frames. The mounting elements may be selected from radially directed lugs and a radially directed flange.

In certain other embodiments, the screen assembly may be selected from horizontal scroll centrifugal screen assemblies having a base wall portion closing the inner end and mounting the screen body for the rotation. The base wall portion may include a plurality of substantially radial webs located on the exposed working face of the base wall portion and extending substantially to the annulus. The plurality of substantially radial webs may include at least four substantially radial vanes of at least 40 mm height above the exposed working face of the base portion.

Alternatively, the screen assembly may be selected from vertical scroll centrifugal screen assemblies having a base of spoke piece mounting said screen body at the discharge end for the rotation.

In yet another embodiment, the annulus is a wear resistant annulus including an annular wall portion, a plurality of wear resistant elements secured by a discontinuous bonding layer to and substantially covering the annular wall portion. The annular wall portion may include drain passages adapted to drain discontinuities in the bonding layer. The drain passages may be selected from one or more a plurality of drainage grooves opening through an edge of the annular wall portion adjacent the screen member, and a plurality of apertures passing radially through the annular wall portion. The apertures passing radially through the annular wall portion may be a plurality of spaced, substantially axial slots.

In still another embodiment, the wear resistant elements may include a bonding face adhered to said discontinuous bonding layer and an opposite wear face. The plurality of wear resistant elements may comprise ceramic elements. The ceramic elements may be formed form a material selected from the group comprising carbides, nitrides and refractory oxides of metals. The material may selected from the group comprising tungsten carbide, aluminium oxide and partially stabilized zirconia.

In still another embodiment, the wear resistant elements may include a plurality of apertures extending through wear face to the bonding face to intersect a discontinuity in the bonding layer. The apertures may have a cross section of less than the screen gauge of said screen surface. The apertures may comprise one or more rows of substantially axial slots.

In still another embodiment, the discontinuous bonding layer may comprise an elastomeric adhesive layer. The elastomeric adhesive layer may be selected from one or more moisture cure polyurethane adhesive materials.

In still another embodiment, a wall portion of the housing divides the housing into an underflow portion having a liquids drain and an overflow portion having a screened-materials outlet, the drain passages draining to the underflow portion.

In a fifth aspect, there is provided a centrifugal screening machine comprising:
the horizontal centrifugal screen assembly as defined in the fourth aspect; and
a delivery assembly passing into the screen through the delivery end and having an outlet for material to be screened located adjacent the inner end.

Other aspects, features, and advantages will become apparent from the following detailed description when taken in conjunction with the accompanying drawings, which are a part of this disclosure and which illustrate, by way of example, principles of any inventions disclosed.

DETAILED DESCRIPTION

Figure 1:
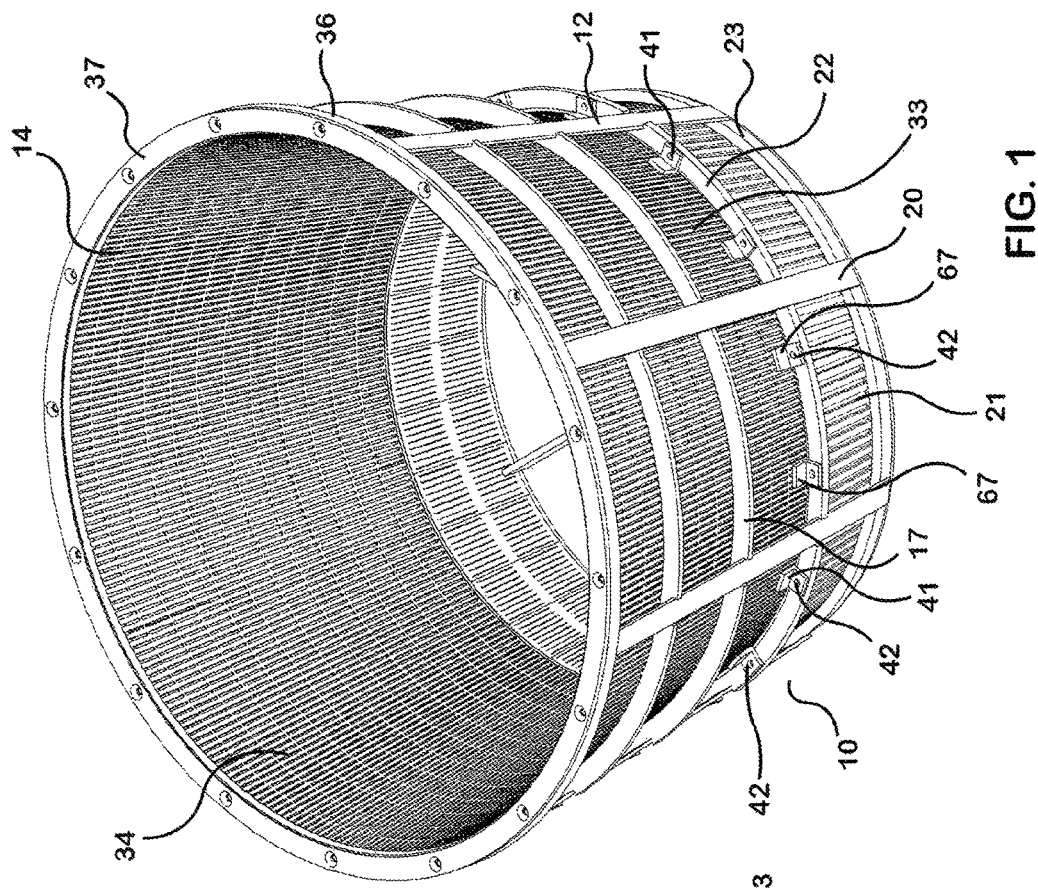
FIG. 1 a perspective view of a horizontal screen assembly in accordance with this disclosure.
Figure 2:
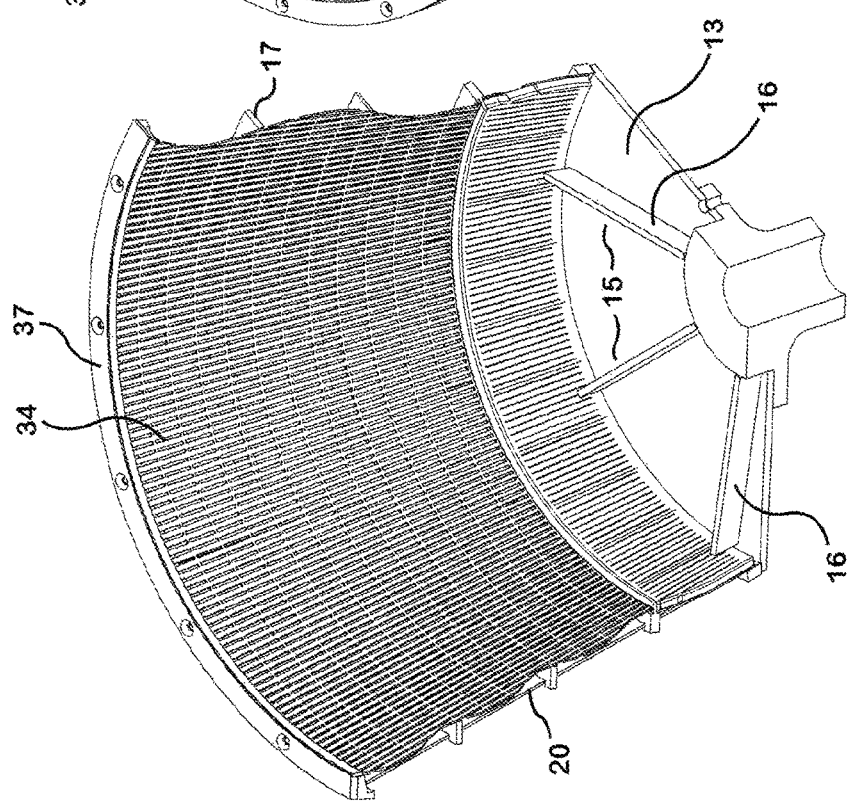
FIG. 2 is a partial cutaway perspective view of the screen assembly of FIG. 1.
Figure 3:
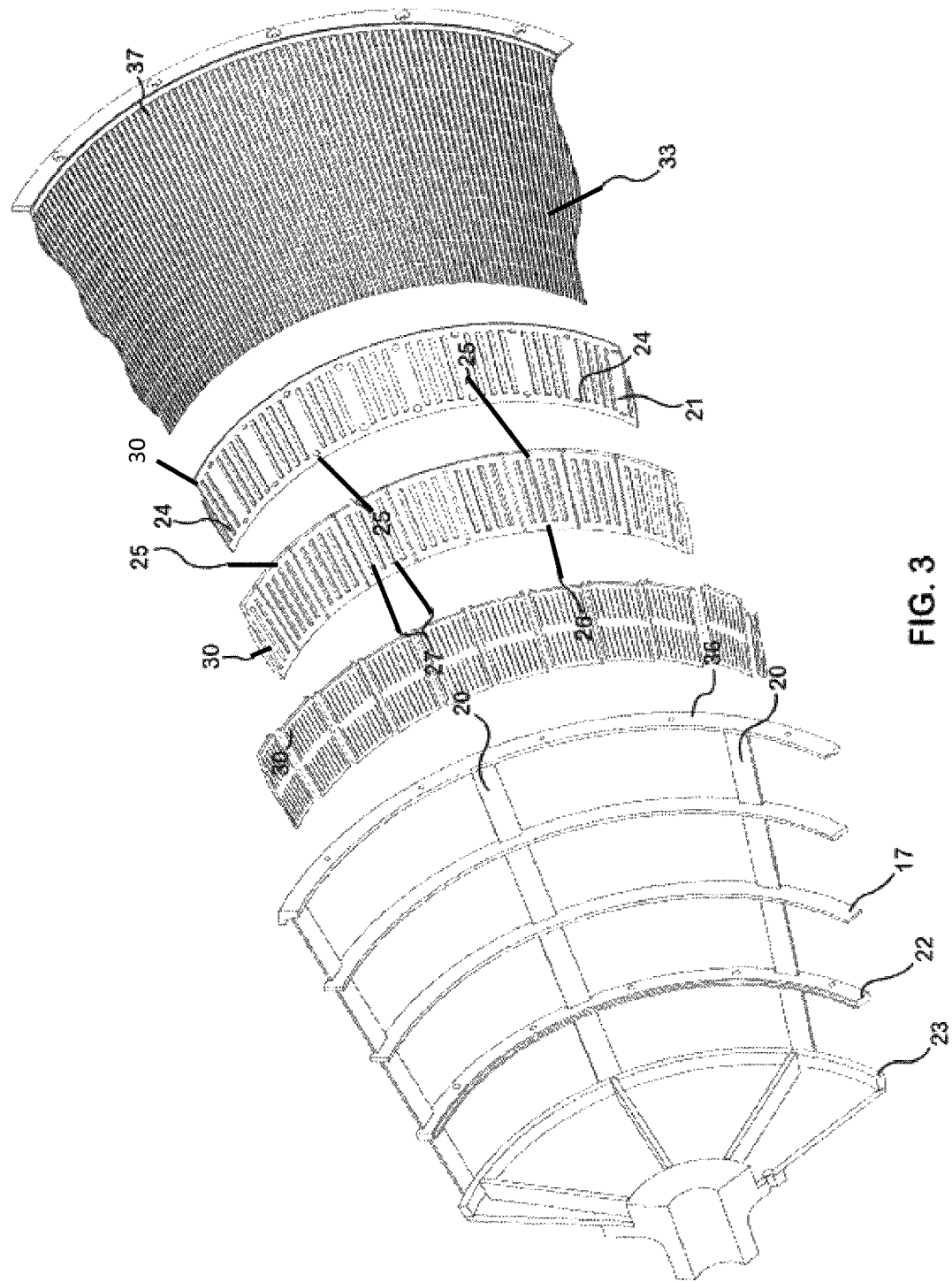
FIG. 3 is an exploded view of the screen assembly of FIG. 1.
Figure 4:
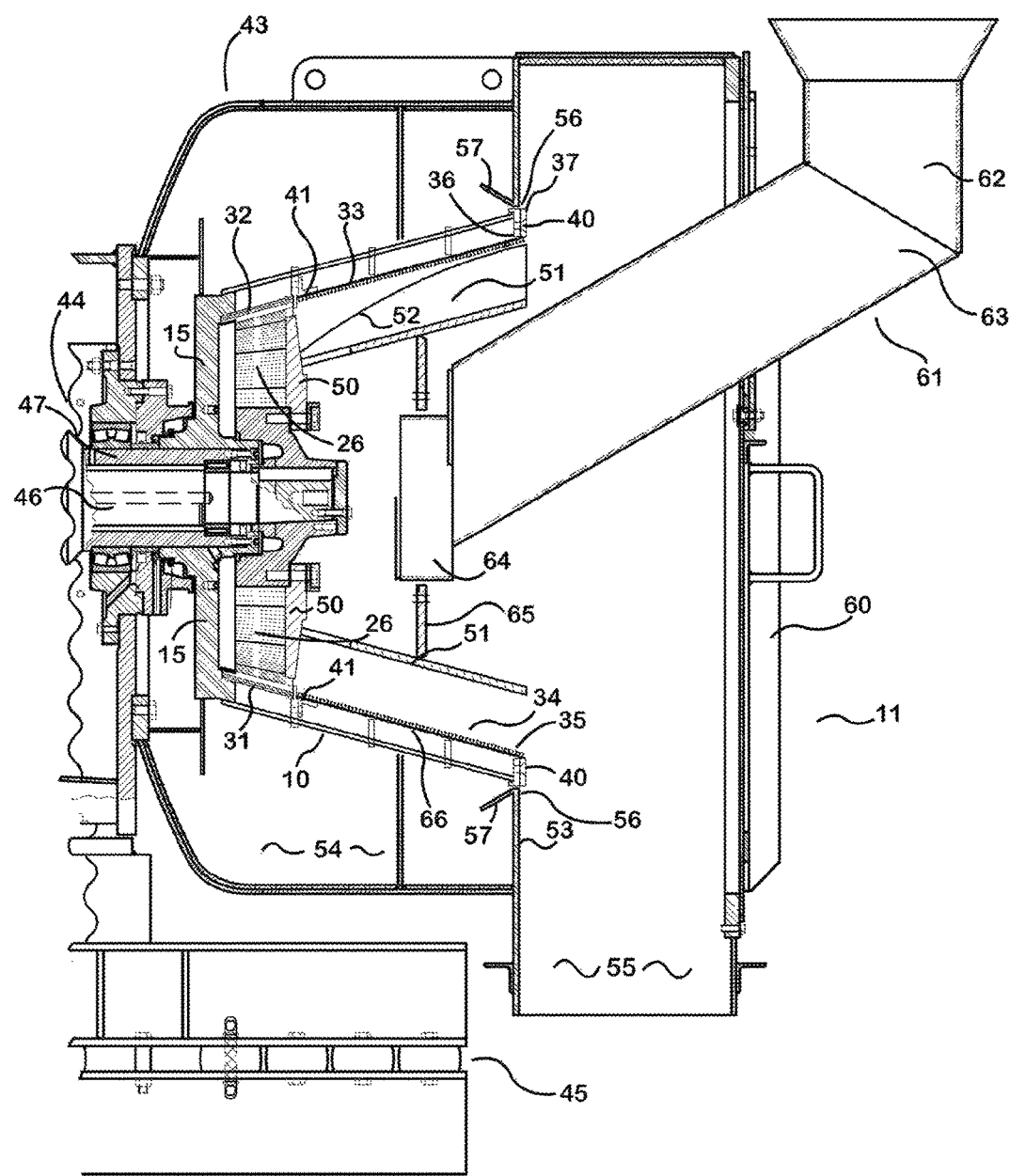
FIG. 4 is a vertical section through a screening machine incorporating the screen assembly of FIG. 1.

In the FIGS. 1 to 4 there is illustrated a first embodiment of a screen assembly 10 suitable for use in a horizontal scroll centrifugal screen machine 11.

The screen assembly 10 comprises a substantially frustoconical-shaped screen body 12 mounted for in-use driven rotation about a central axis and diverging axially from an inner, inlet end 13 to an outer, discharge end 14. A base wall portion 15 closes the inner end 13 and mounts the screen body 12 for rotation.

The base wall portion 15 includes eight evenly spaced, 40 mm deep, substantially radial, stainless steel webs 16 located on an exposed working face of the base wall portion 15. This serves the purpose of creating a dead space adjacent the base wall, reducing its wear rate. As an alternative, the base wall portion may be lined with or formed with webs of ceramic wear resistant material.

The frustoconical-shaped screen body 12 in this embodiment includes a supporting structure comprising axially spaced ring frames 17 interconnected by a plurality of circumferentially spaced stringers 20. An annular wall portion 21 is located on the screen body 12 adjacent the inner end 13. The annular wall portion 21 is in this embodiment a continuous annulus formed of stainless steel and welded to an inner ring frame 22 and base ring frame 23.

The annular wall portion 21 includes drain passages 24 adapted to drain discontinuities in a bonding layer overlying the annular wall portion 21. In this example the drain passages 24 passing radially through the annular wall portion 21 comprise two rows of spaced, substantially axial, slotted drain passages 24. The rows of drain passages 24 divide a bonding surface of the annular wall portion 21 into three circumferentially contiguous and axially discontinuous bonding zones 25. The gauge of the slotted drain passages 24 is selected in this example to be greater that the screen gauge to enable free flushing of fines. In this example the slotted drain passages 24 are about 5 mm wide.

A plurality of wear resistant elements 26 are formed from sintered ceramic powder, in this example tungsten carbide. The wear resistant elements 26 include a bonding face and an opposite wear face, with a plurality of apertures 27 extending through wear face to the bonding face. The apertures 27 have a cross section of less than the screen gauge of said screen surface, in this example in the form of slots of about 0.4 mm gauge. The apertures 27 are arranged in two rows of substantially axial slots, defining three circumferentially contiguous and axially discontinuous bonding regions 30 corresponding to the bonding zones 25.

The wear resistant elements 26 are bonded to the annular wall portion 21 by a discontinuous bonding layer 31 comprising a moisture cure polyurethane sealant/adhesive, in this example that marketed as SIKAFLEX® EBT. The discontinuous bonding layer 31 is discontinuous by virtue of being confined to the regions between the bonding regions 30 and the bonding zones 25, leaving voids 32. The voids 32 provide fluid interconnection between the apertures 27 and the drain passages 24.

A substantially frustoconical, replaceable screen member 33 is supported in the screen body 12 and defines a screening surface 34 extending from the discharge end 14 toward the inner end 13. The screening surface 34 defined by a plurality of wedge wires 35. The replaceable screen member is releasably secured to the screen body at the inner ring frame 22 and an outer ring frame 36. The replaceable screen member 33 includes a radial flange 37 at the discharge end 14 and corresponding to the outer ring frame 36, to which it is secured by circumferentially spaced countersunk metal threads 40. The replaceable screen member 33 further includes a plurality of welded-on radially directed lugs 41 adjacent the inner ring frame 22 and secured thereto by individual countersunk metal threads 42.

The horizontal centrifugal screen assembly 10 is mounted for rotation in a horizontal screen housing 43 mounted to a drive assembly 44 and ultimately supported on a base assembly 45. The drive assembly 44 includes an inner drive shaft 46 and an outer drive shaft 47 driven differentially to the inner drive shaft 46. The base wall portion 15 mounts the centrifugal screen assembly 10 for rotation on the outer drive shaft 47. The inner drive shaft 46 passes through the base wall portion 15 and mounts a spoke piece 50 to which is mounted a scroll assembly 51. The scroll assembly 51 is adapted to run with scroll edges 52 in close proximity to the screen surface 34.

The housing 43 is divided by a wall portion 53 into an underflow chamber 54 receiving filtrate and an overflow chamber 55 receiving solids claimed from the screening surface 34 by the scroll assembly 51. The outer ring frame 36 and radial flange 37 in assembly rotate in close proximity to the peripheral edge 56 of an aperture in the dividing wall portion 53. The peripheral edge 56 has a flange 57 stiffening the peripheral edge 56 and turning water away from the peripheral edge 56. The housing is closed by a housing door assembly 60.

A delivery system 61 comprises a chute assembly 62 receiving material to be screened and delivering the material to the inner end 13 via a conduit 63 rigidly supported in assembly with the door assembly 60. The inner end of the conduit 63 is configured with a cylindrical spout portion 64. The scroll assembly 51 includes a baffle plate 65 rotating in close proximity to the spout portion 64 and serving to ensure that material to be screened is confined to the inner end 13 until screened.

In maintenance, the door assembly 60 is opened and the scroll assembly 51 and spoke piece 50 are released from the inner drive shaft 46 and removed from the housing. The scroll assembly 51 is serviced or replaced as dictated by wear. The base wall portion 15 is released from the outer drive shaft 47 to permit the screen assembly 10 to be withdrawn from the housing. The countersunk metal threads 40 are removed to release the radial flange 37 from the outer ring frame 36, and the countersunk metal threads 42 are removed to release the plurality of welded-on radially directed lugs 41 from the inner ring frame 22, to release the replaceable screen member 33 from the screen body 12. The taper of the screen body 12 permits the array of radially directed lugs 41 to clear the outer ring frame 36 on withdrawal of the replaceable screen member 33 from the screen body 12 for replacement. Reassembly is the reverse of disassembly.

The replaceable screen member 33 is formed from a panel formed of wedge wires 35 ERC welded transversely to set wires 66. The panel is cut into four sectors that are then pressed and trimmed to form quarters of the screening surface 34. Four longitudinal butt welds secure the four sectors into an initial frustoconical form, which is rolled to shape. The radial flange 37 is welded to the wider open end of the screening surface 34, the flange extending perpendicular of the conical axis. The plurality of radially directed lugs 41 are each formed with a weld platform 67 forming an acute angle with the lug 41 so that when the weld platform 67 is welded to the back of the screening surface 34 the lugs 41 are substantially perpendicular to the conical axis.

Figure 5:
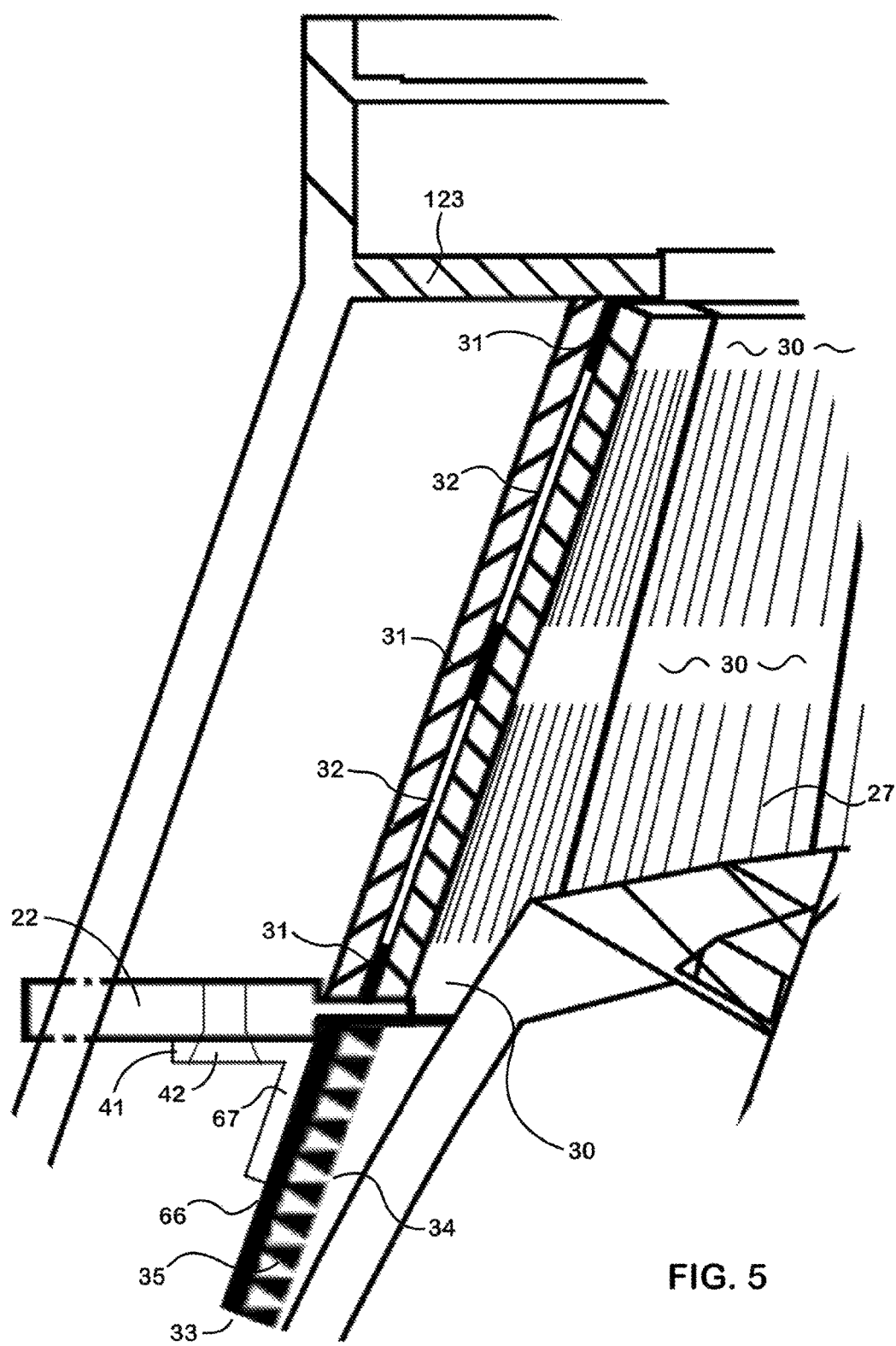
FIG. 5 is a screen detail of a vertical screen assembly in accordance with this disclosure.
Figure 6:
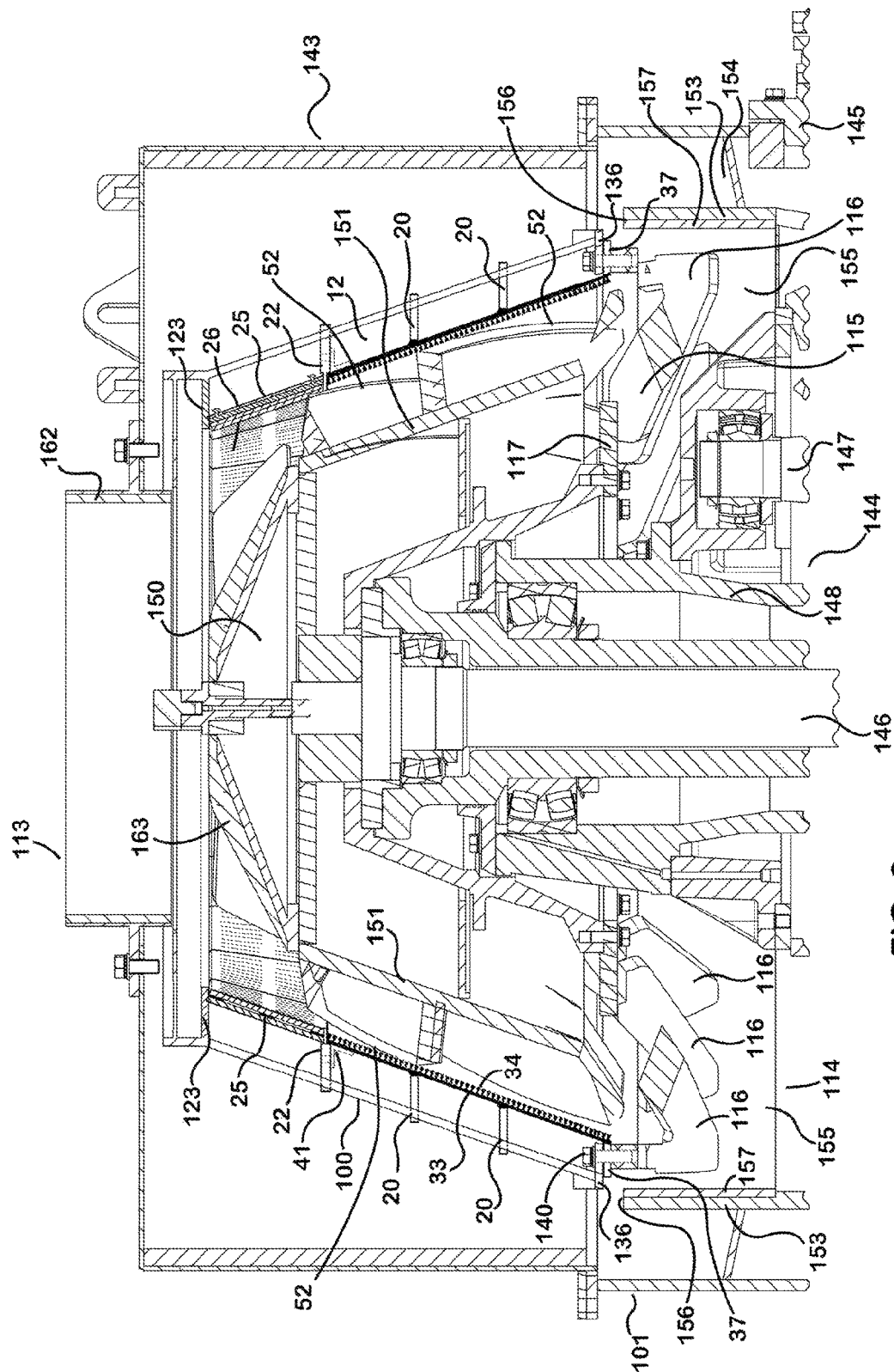
FIG. 6 is a vertical section through a vertical screen machine incorporating the detail of FIG. 5.
Figure 7:
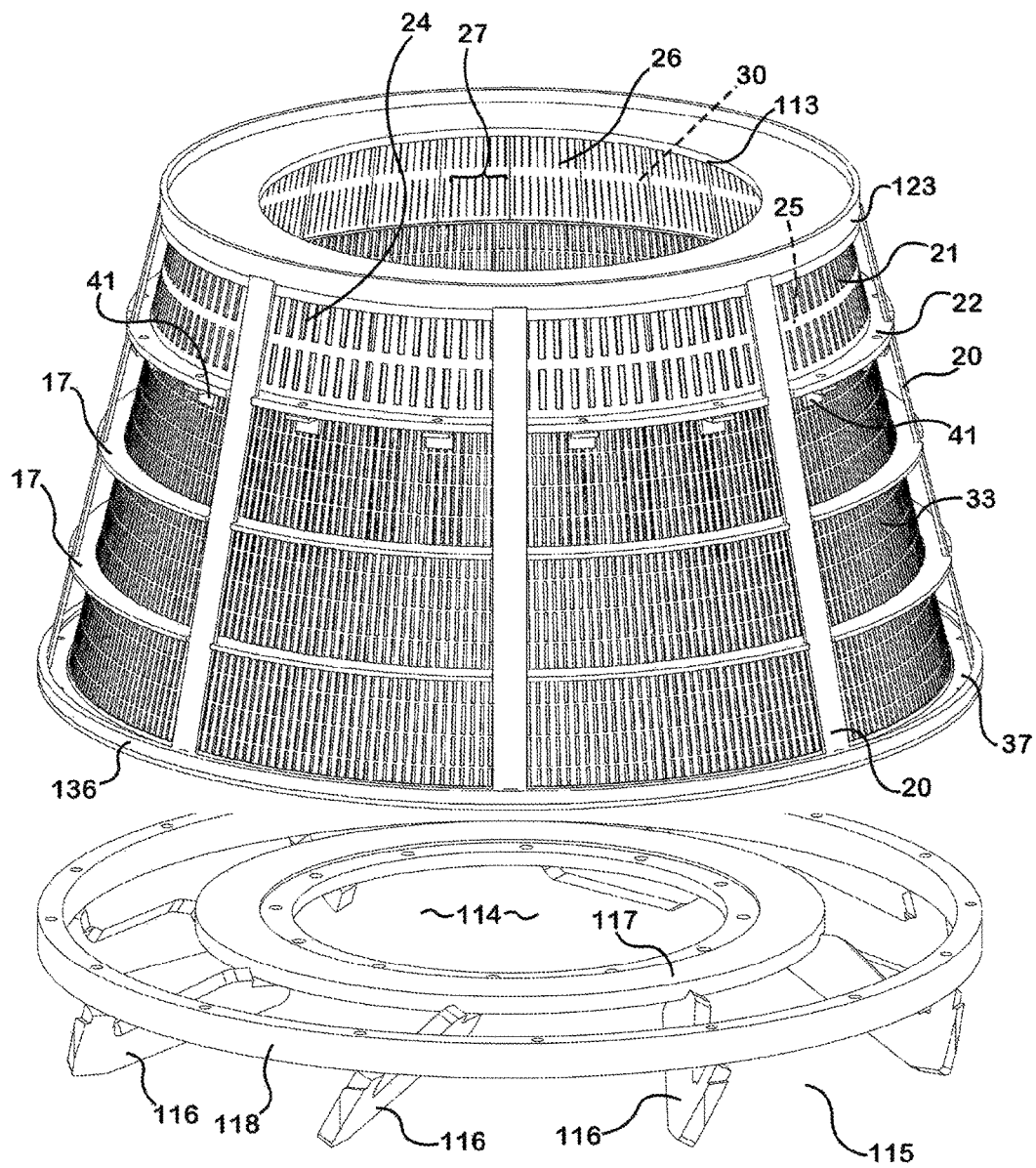
FIG. 7 is an exploded view of a screen assembly of the type for use in the machine of FIG. 6.

In the FIGS. 5 to 7 there is illustrated a second embodiment of a screen assembly 100 used in a vertical scroll centrifugal screen machine 101, wherein features of the second embodiment are numbered the same as the corresponding features of the first embodiment.

The screen assembly 100 comprises a substantially frustoconical-shaped screen body 12 mounted for in-use driven rotation about a central axis and diverging axially from an upper, inlet end 113 to a lower, discharge end 114. A base-of-spoke piece 115 spans the lower end 113 and mounts the screen body 12 for rotation.

The base-of-spoke piece 115 includes eight evenly spaced impeller spokes 116 fabricated to an inner, drive ring 117 and an outer, screen body support ring 118.

The frustoconical-shaped screen body 12 in this embodiment includes a supporting structure comprising axially spaced ring frames 17 interconnected by a plurality of circumferentially spaced stringers 20. An annular wall portion 21 is located on the screen body 12 adjacent the upper end 113. The annular wall portion 21 is in this embodiment a continuous annulus formed of stainless steel and welded to an inner ring frame 22 and an upper ring frame 123.

The annular wall portion 21 includes drain passages 24 adapted to drain discontinuities in a bonding layer overlying the annular wall portion 21. In this example the drain passages 24 passing radially through the annular wall portion 21 comprise two rows of spaced, substantially axial, slotted drain passages 24. The rows of drain passages 24 divide a bonding surface of the annular wall portion 21 into three circumferentially contiguous and axially discontinuous bonding zones 25. The gauge of the slotted drain passages 24 is selected in this example to be greater that the screen gauge to enable free flushing of fines. In this example the slotted drain passages 24 are about 5 mm wide.

A plurality of wear resistant elements 26 are formed from sintered ceramic powder, in this example tungsten carbide. The wear resistant elements 26 include a bonding face and an opposite wear face, with a plurality of apertures 27 extending through wear face to the bonding face. The apertures 27 have a cross section of less than the screen gauge of said screen surface, in this example in the form of slots of about 0.4 mm gauge. The apertures 27 are arranged in two rows of substantially axial slots, defining three circumferentially contiguous and axially discontinuous bonding regions 30 corresponding to the bonding zones 25.

The wear resistant elements 26 are bonded to the annular wall portion 21 by a discontinuous bonding layer 31 comprising a moisture cure polyurethane sealant/adhesive, in this example that marketed as SIKAFLEX® EBT. The discontinuous bonding layer 31 is discontinuous by virtue of being confined to the regions between the bonding regions 30 and the bonding zones 25, leaving voids 32. The voids 32 provide fluid interconnection between the apertures 27 and the drain passages 24.

A substantially frustoconical, replaceable screen member 33 is supported in the screen body 12 and defines a screening surface 34 extending from the discharge end 114 toward the upper end 113. The screening surface 34 defined by a plurality of wedge wires 35. The replaceable screen member is releasable secured to the screen body at the inner ring frame 22 and a lower mounting flange 136. The replaceable screen member 33 includes a radial flange 37 at the lower, discharge end 114 and corresponding to the lower mounting flange 136. Circumferentially spaced machine screws 140 tapped into the base-of-spoke piece 115 pass through the lower mounting flange 136 and trap the radial flange 37 to the base-of-spoke piece 115. The replaceable screen member 33 further includes a plurality of welded-on radially directed lugs 41 adjacent the inner ring frame 22 and secured thereto by individual countersunk metal threads 42.

The vertical centrifugal screen assembly 100 is mounted for rotation in a vertical screen housing 143 mounted to a drive assembly 144 and ultimately supported on a base assembly 145. The drive assembly 144 includes a scroll assembly drive shaft 146 and parallel screen assembly drive shaft 147. The base-of-spoke piece 115 mounts the centrifugal screen assembly 100 for rotation on a hub 148, which is gear driven from the screen assembly drive shaft 147. The scroll assembly drive shaft 146 passes through the hub 148 and mounts an inlet cone assembly 150 to which is mounted a scroll assembly 151. The scroll assembly 151 is adapted to run with scroll edges 52 in close proximity to the screen surface 34.

The housing 143 is divided by an annular wall portion 153 into an underflow chamber 154 receiving filtrate and an overflow chamber 155 receiving solids claimed from the screening surface 34 by the scroll assembly 151. The lower mounting flange 136 and radial flange 37 in assembly rotate in close proximity to a peripheral edge 156 of the annular wall portion 153. The annular wall portion 153 has a wear lining 157.

A delivery system comprises an upper inlet 162 receiving material to be screened and delivering the material to the inlet cone assembly 150, which includes vanes 163 directing the material centrifugally outward.

In maintenance, the inlet 162 and housing 143 are removed as an assembly. The screen assembly 100 is removed from the base-of-spoke piece 115 by releasing the machine screws 140. The scroll assembly 151 may be released from the scroll assembly drive shaft 146 if it or the base-of-spoke piece 115 or underlying mechanics need to be serviced. The scroll assembly 151 is serviced or replaced as dictated by wear.

The base-of-spoke piece 151 may be released from hub 148 if it is worn. The releasing the machine screws 140 also serves to release the radial flange 37 from the lower mounting flange 136. Removing the countersunk metal threads 42 releases the plurality of welded-on radially directed lugs 41 from the inner ring frame 22, to release the replaceable screen member 33 from the screen body 112. The taper of the screen body 112 permits the array of radially directed lugs 41 to clear the lower mounting flange 136 on withdrawal of the replaceable screen member 33 from the screen body 112 for replacement.

Reassembly is the reverse of disassembly. The replaceable screen member 33 is formed substantially as per the first embodiment.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

Apparatus in accordance with both of the foregoing embodiments has the advantage that the material to be screened impinges on a wall portion that is lined with a wear resistant ceramic material that is resiliently bonded to a stainless steel substrate. The discontinuous bonding layer cooperates with the slots in the ceramic elements and the slots in the wall portion to freely drain the discontinuity voids in the bonding layer. It is theorized that this prevents centripetal force pressurizing a fluid lining the bonding layer, which may tend to cause separation of the ceramic elements.

Apparatus in accordance with both of the foregoing embodiments has the further advantage that a removable screening surface may be replaced as a relatively cheap and simple component while the wear resistant ceramic lined wall portion outlasts multiple screening surfaces.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A centrifugal screen assembly including:
    a substantially frustoconical-shaped screen body mounted for in-use driven rotation about a central axis and diverging axially from an inner, inlet end to an outer, discharge end;
    a substantially frustoconical screen member supported in said screen body and defining a screening surface extending from said discharge end toward said inner end;
    an annular wall portion located on said screen body adjacent the inner end and extending axially substantially to said screen member, and
    a plurality of wear resistant elements secured by a discontinuous bonding layer to and substantially covering the annular wall portion,
    wherein the annular wall portion includes drain passages adapted to drain discontinuities in said bonding layer,
    wherein the drain passages are selected from one or more of a plurality of drainage grooves opening through an edge of the annular wall portion adjacent the screen member, and a plurality of apertures passing radially through the annular wall portion.

2. The centrifugal screen assembly according to claim 1 1, wherein the apertures passing radially through the annular wall portion are a plurality of spaced, substantially axial slots.

3. The centrifugal screen assembly according to claim 1, wherein said wear resistant elements include a bonding face adhered to said discontinuous bonding layer and an opposite wear face.

4. The centrifugal screen assembly according to claim 3, wherein the plurality of wear resistant elements comprise ceramic elements.

5. The centrifugal screen assembly according to claim 4, wherein the ceramic elements are formed from a material selected from the group comprising carbides, nitrides and refractory oxides of metals.

6. The centrifugal screen assembly according to claim 5, wherein the material is selected from the group comprising tungsten carbide, aluminum oxide and partially stabilized zirconia.

7. The centrifugal screen assembly according to claim 1, wherein said wear resistant elements include a plurality of apertures extending through wear face to the bonding face to intersect a discontinuity in the bonding layer.

8. The centrifugal screen assembly according to claim 7, wherein the apertures have a cross section of less than the screen gauge of said screen surface.

9. The centrifugal screen assembly according to claim 8, wherein the apertures comprise one or more rows of substantially axial slots.

10. The centrifugal screen assembly according to claim 1, wherein the discontinuous bonding layer comprises an elastomeric adhesive layer.

11. The centrifugal screen assembly according to claim 10, wherein the elastomeric adhesive layer is elected from one or more moisture cure polyurethane adhesive materials.

12. The centrifugal screen assembly according to claim 1, wherein the frustoconical-shaped screen body includes a supporting structure comprising axially spaced ring frames interconnected by a plurality of stringers, the annular wall portion being a continuous annulus formed of a material selected from ferrous alloys and welded to one or more of the ring frames and stringers.

13. The centrifugal screen assembly according to claim 1, wherein the frustoconical-shaped screen member has its screening surface defined by a plurality of wedge wires.

14. The centrifugal screen assembly according to claim 13, wherein the screen member is a frustoconical shape fabricated from segments cut from flat wedge wire panels, the segments being pressed to a selected curvature and welded together.

15. The centrifugal screen assembly according to claim 13, wherein the screen surface member is integral with the frustoconical-shaped screen body.

16. The centrifugal screen assembly according to claim 1, wherein the frustoconical-shaped screen member is replaceable in the screen body.

17. The centrifugal screen assembly according to claim 16, wherein the supporting structure includes axially spaced ring frames interconnected by a plurality of stringers, the annular wall portion being supported between inner end and a selected inner ring frame, the open end being defined by an outer ring frame, the replaceable screen member being releasably secured to the inner and outer ring frames.

18. The centrifugal screen assembly according to claim 17, wherein the screen member is a frustoconical shape fabricated from segments cut from flat wedge wire panels, the segments being pressed to a selected curvature and welded together, the axial ends of the screen member each having a radially directed mounting elements releasable secured to the inner and outer ring frames.

19. The centrifugal screen assembly according to claim 18, wherein the mounting elements are selected from radially directed lugs and a radially directed flange.

20. The centrifugal screen assembly according to claim 1, and selected from horizontal scroll centrifugal screen assemblies having a base wall portion closing the inner end and mounting the screen body for said rotation.

21. The centrifugal screen assembly according to claim 20, wherein the bas wall portion includes a plurality of substantially radial webs located on the exposed working face of the base portion and extending substantially to the wear resistant elements.

22. The centrifugal screen assembly according to claim 21, wherein the plurality of substantially radial webs includes at least four substantially radial vanes of at least 40 mm height above the exposed working face of the base wall portion.

23. The centrifugal screening machine comprising:
a centrifugal screen assembly according to claim 20, mounted for said rotation in a housing; and
a delivery assembly entering the housing and passing into the screen body through the delivery end and having an outlet for material to be screened located adjacent the inner end.

24. The centrifugal screen assembly according to claim 1, and selected from vertical scroll centrifugal screen assemblies having a base of spoke piece mounting said screen body at said discharge end for said rotation.

25. The centrifugal screening machine including:
a centrifugal screen assembly according to claim 24 mounted for said rotating in a housing; and
a delivery assembly entering the housing adjacent the inner end and having an annular outlet for material to be screened substantially occluding said inner end.

26. A centrifugal screen assembly including:
a frustoconical-shaped screen body having a central axis, the screen body including a frame portion; and
a replaceable screen member;
the screen body being mounted for in-use driven rotating about its central axis in a housing, the screen body further including an annulus defining an annular screen wall portion adjacent the inner end and extending axially to the replaceable screen member
the annular screen wall potion and the replaceable screen member together forming a screen diverging axially from an inner end to an outer, discharge end located in an aperture in a wall portion of the housing; and
the replaceable screen member extending axially from the annular screen wall portion to the outer discharge end,
wherein the annulus is a wear resistant annulus including an annular wall portion, a plurality of wear resistant elements secured by a discontinuous bonding layer to and substantially covering the annular wall portion,
wherein the annular wall portion includes drain passages adapted to drain discontinuities in said bonding layer,
wherein the drain passages are selected from one or more of a plurality of drainage grooves opening through an edge of the annular wall portion adjacent the screen member, and a plurality of apertures passing radially through the annular wall portion, and
wherein the apertures passing radially through the annular wall portion are a plurality of spaced, substantially axial slots.

27. The centrifugal screen assembly according to claim 26, wherein the frame portion includes a supporting structure comprising axially spaced ring frames interconnected by a plurality of stringers.

28. The centrifugal screen assembly according to claim 27, wherein the annulus is located between an inner end and a selected inner ring frame, the discharge end being defined by an outer ring frame, the replaceable screen member being releasably secured to the inner and outer ring frames.

29. The centrifugal screen assembly according to claim 26, wherein the replaceable screen member is of a frustoconical shape fabricated from segments cut from flat wedge wire panels, the segments being pressed to a selected curvature and welded together, the axial ends of the screen member each having a radially directed mounting elements releasable secured to the inner and outer ring frames.

30. The centrifugal screen assembly according to claim 29, wherein the mounting elements are selected from radially directed lugs and a radially directed flange.

31. The centrifugal screen assembly according to claim 26, selected from horizontal scroll centrifugal screen assemblies having a base wall portion closing the inner end and mounting the screen body for said rotation.

32. The centrifugal screen assembly according to claim 31, wherein the base wall portion includes a plurality of substantially radial webs located on the exposed working face of the base wall portion and extending substantially to the annulus.

33. The centrifugal screen assembly according to claim 32, wherein the plurality of substantially radial webs includes at least four substantially radial vanes of at least 40 mm height above the exposed working face of the base portion.

34. The centrifugal screen assembly according to claim 16, and selected from vertical scroll centrifugal screen assemblies having a base of spoke piece mounting said screen body at said discharge end for said rotation.

35. The centrifugal screen assembly according to claim 26, wherein said wear resistant elements include a bonding face adhered to said discontinuous bonding layer and an opposite wear face.

36. The centrifugal screen assembly according to claim 35, wherein the plurality of wear resistant elements comprise ceramic elements.

37. The centrifugal screen assembly according to claim 36, wherein the ceramic elements are formed from a material selected from the group comprising carbides, nitrides and refractor oxides of metals.

38. The centrifugal screen assembly according to claim 37, wherein the material is selected from the group comprising tungsten carbide, aluminium oxide and partially stabilized zirconia.

39. The centrifugal screen assembly according to claim 26, wherein said wear resistant elements include a plurality of aperture extending through wear face to bonding face to intersect a discontinuity in the bonding layer.

40. The centrifugal screen assembly according to claim 39, wherein the apertures have a cross section of less than the screen gauge of said screen surface.

41. The centrifugal screen assembly according to claim 40, wherein the apertures comprise one or more rows of substantially axial slots.

42. The centrifugal screen assembly according to claim 26, wherein the discontinuous bonding layer comprises an elastomeric adhesive layer.

43. The centrifugal screen assembly according to claim 42, wherein the elastomeric adhesive layer is selected from one or more moisture cure polyurethane adhesive materials.

44. The centrifugal screen assembly according to claim 26, wherein the wall portion divides the housing into an underflow portion having a liquids drain and an overflow portion having a screened-materials outlet, the drain passages draining to the under flow portion.

45. A centrifugal screening machine comprising:
a centrifugal screen assembly according to claim 31; and
a delivery assembly passing into the screen through the deliver end and having an outlet for material to be screened located adjacent the inner end.

46. The centrifugal screen assembly according to claim 35, wherein the wall portion divides the housing into an underflow portion having a liquids drain and an overflow portion having a screened-materials outlet, the drain passages draining to the underflow portion.

47. The centrifugal screen assembly according to claim 39, wherein the wall portion divides the housing into an underflow portion having a liquids drain and an overflow portion having a screened-materials outlet, the drain passages draining to the underflow portion.

48. The centrifugal screen assembly according to claim 42, wherein the wall portion divides the housing into an underflow portion having a liquids drain and an overflow portion having a screened-materials outlet, the drain passages draining to the underflow portion.

49. A centrifugal screen assembly including:
a frustoconical-shaped screen body having a central axis, the screen body including a frame portion; and
a replaceable screen member;
the screen body being mounted for in-use driven rotating about its central axis in a housing, the screen body further including an annulus defining an annular screen wall portion adjacent the inner end and extending axially to the replaceable screen member
the annular screen wall potion and the replaceable screen member together forming a screen diverging axially from an inner end to an outer, discharge end located in an aperture in a wall portion of the housing; and
the replaceable screen member extending axially from the annular screen wall portion to the outer discharge end,
wherein the annulus is a wear resistant annulus including an annular wall portion, a plurality of wear resistant elements secured by a discontinuous bonding layer to and substantially covering the annular wall portion,
wherein said wear resistant elements include a plurality of aperture extending through wear face to bonding face to intersect a discontinuity in the bonding layer,
wherein the apertures have a cross section of less than the screen gauge of said screen surface, and
wherein the apertures comprise one or more rows of substantially axial slots.

* * * * *